United States Patent
Yeh et al.

(10) Patent No.: US 12,549,494 B2
(45) Date of Patent: Feb. 10, 2026

(54) SYSTEMS AND METHODS FOR SCHEDULING TRANSITORY DATA TRANSMISSIONS IN AN INTERACTIVE ENVIRONMENT

(71) Applicant: Universal City Studios LLC, Universal City, CA (US)

(72) Inventors: Wei Cheng Yeh, Orlando, FL (US); Rachel Elise Rodgers, Orlando, FL (US); Christina Corrine Lee, Richmond, VA (US)

(73) Assignee: Universal City Studios LLC, Universal City, CA (US)

( * ) Notice: Subject to any disclaimer, the term of this patent is extended or adjusted under 35 U.S.C. 154(b) by 70 days.

(21) Appl. No.: 18/736,191

(22) Filed: Jun. 6, 2024

(65) Prior Publication Data

US 2024/0414095 A1    Dec. 12, 2024

Related U.S. Application Data

(60) Provisional application No. 63/507,326, filed on Jun. 9, 2023.

(51) Int. Cl.
  *G06F 15/16*    (2006.01)
  *G01S 13/02*    (2006.01)
  (Continued)

(52) U.S. Cl.
  CPC .......... *H04L 47/62* (2013.01); *G01S 13/0209* (2013.01); *G06T 19/006* (2013.01); *H04L 47/52* (2013.01)

(58) Field of Classification Search
  CPC ....... H04L 47/52; H04L 47/62; G01S 1/0209; G06T 19/006
  (Continued)

(56) References Cited

U.S. PATENT DOCUMENTS 9,924,243 B2 *  3/2018  Lupien ................ H04W 84/18
9,953,195 B2    4/2018  Turner et al.
(Continued)

FOREIGN PATENT DOCUMENTS

WO    2022212665 A1    10/2022

OTHER PUBLICATIONS

PCT/US2024/033067 International Search Report and Written Opinion mailed Oct. 29, 2024.

*Primary Examiner* — Moustafa M Meky
(74) *Attorney, Agent, or Firm* — Fletcher Yoder, P.C.

(57) ABSTRACT

An interactive system includes an environment controller and an interactive device. The interactive device includes one or more processors, one or more memory devices, and communication circuitry. The interactive device is communicatively coupled to the environment controller, the one or more processors may transmit regularly monitored data corresponding to the interactive device to the environment controller at a plurality of transmission schedules. The one or more processors may also receive transitory data indicative of an interaction with the interactive device. Further, the one or more processors may determine a transmission schedule of the plurality of transmission schedules on which to transmit the transitory data. Further still, the one or more processors may transmit the transitory data on the transmission schedule along with a corresponding portion of the regularly monitored data to the environment controller.

20 Claims, 6 Drawing Sheets

(51) Int. Cl.
  *G06T 19/00*   (2011.01)
  *H04L 47/52*   (2022.01)
  *H04L 47/62*   (2022.01)

(58) Field of Classification Search
  USPC .......................................................... 709/238
  See application file for complete search history.

(56) References Cited

U.S. PATENT DOCUMENTS

| | | | |
|---|---|---|---|
| 10,105,594 B2 | 10/2018 | Goslin et al. | |
| 10,302,737 B2 | 5/2019 | Hehn et al. | |
| 10,440,533 B2 | 10/2019 | Gherardi et al. | |
| 10,885,769 B2* | 1/2021 | Schwarzkopf | H04Q 9/00 |
| 11,063,907 B2* | 7/2021 | Spurlock | H04L 63/0227 |
| 11,243,528 B2* | 2/2022 | Cella | H04L 1/1854 |
| 11,403,147 B2* | 8/2022 | Aronov | H04L 67/34 |
| 11,924,317 B1* | 3/2024 | Pinto | G06F 1/163 |
| 12,333,347 B2* | 6/2025 | Chitalia | H04L 41/22 |
| 12,340,712 B1* | 6/2025 | Saijo | G09B 5/065 |
| 12,353,790 B1* | 7/2025 | Pinto | H04J 3/0667 |
| 2015/0098357 A1* | 4/2015 | Lupien | H04Q 9/00 370/254 |
| 2015/0130632 A1* | 5/2015 | Tsao | H04Q 9/00 340/870.07 |
| 2021/0019195 A1* | 1/2021 | Aronov | G06F 9/4856 |
| 2021/0198605 A1* | 7/2021 | Ohashi | C12M 41/14 |
| 2022/0245238 A1* | 8/2022 | Dasen | H04L 9/3247 |
| 2022/0357997 A1* | 11/2022 | Aronov | H04L 67/10 |
| 2022/0360938 A1 | 11/2022 | Bessems et al. | |
| 2025/0024529 A1* | 1/2025 | Iida | H04B 11/00 |

\* cited by examiner

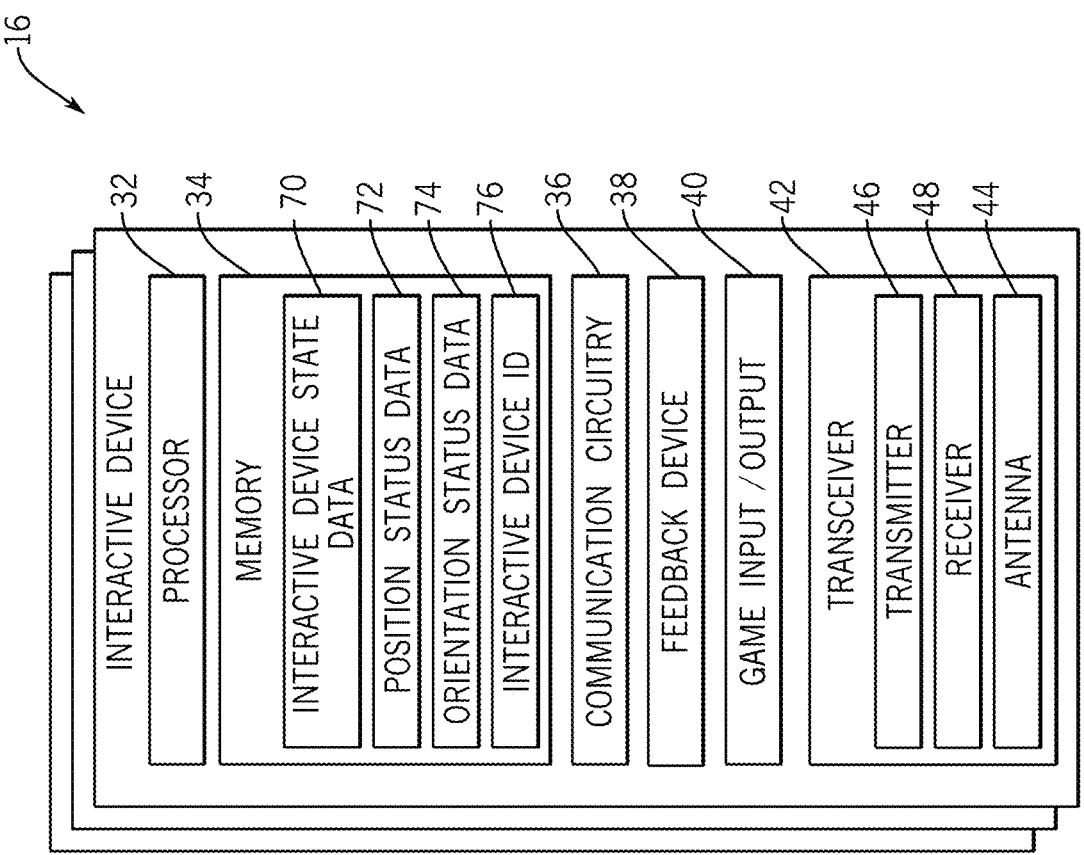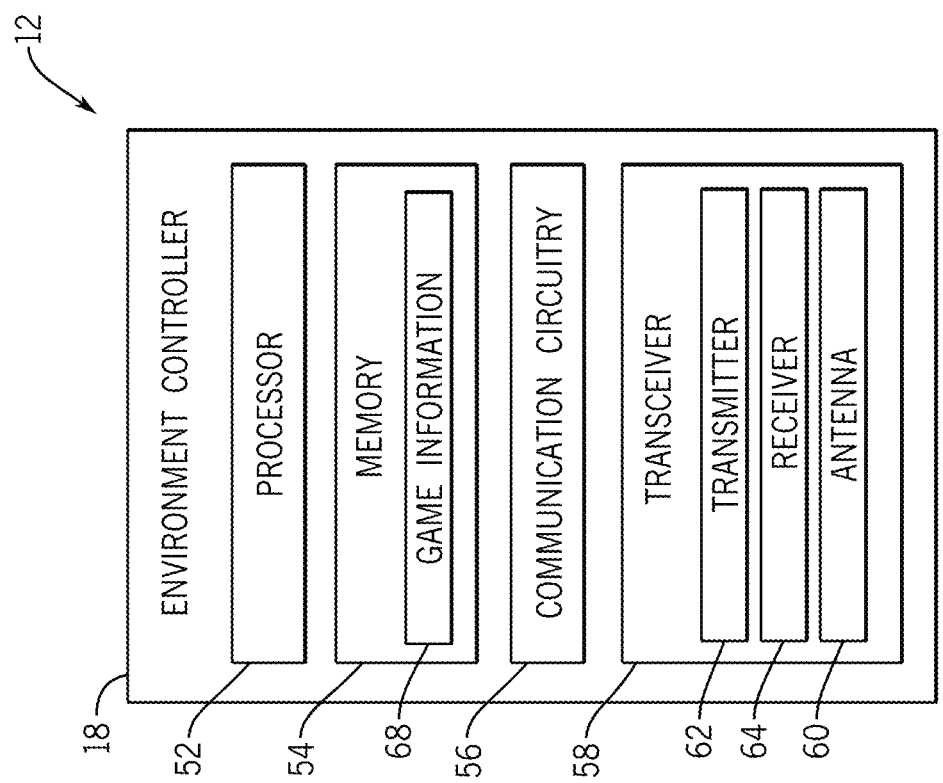
FIG. 2

SYSTEMS AND METHODS FOR SCHEDULING TRANSITORY DATA TRANSMISSIONS IN AN INTERACTIVE ENVIRONMENT

CROSS REFERENCE TO RELATED APPLICATIONS

This application claims priority to and the benefit of U.S. Provisional Application Ser. No. 63/507,326, filed Jun. 9, 2023, entitled "SYSTEMS AND METHODS FOR SCHEDULING TRANSITORY DATA TRANSMISSIONS IN AN INTERACTIVE ENVIRONMENT," which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks often include interactive areas, including rides and attractions. Some interactive areas may include features that provide the same guest experience for every guest. However, providing different or unique features that may be tailored for each guest may enhance and provide better guest experiences for each guest. It is now recognized that it is desirable to provide different or unique features in interactive areas of amusement parks that provide different or unique guest experiences for each guest based on, for example, guest input.

BRIEF DESCRIPTION

Certain embodiments commensurate in scope with the originally claimed subject matter are discussed below. These embodiments are not intended to limit the scope of the disclosure. Indeed, the present disclosure may encompass a variety of forms that may be similar to or different from the embodiments set forth below.

In one embodiment, an interactive system includes an environment controller and an interactive device. The interactive device includes one or more processors, one or more memory devices, and communication circuitry. The interactive device is communicatively coupled to the environment controller, the one or more processors may transmit regularly monitored data corresponding to the interactive device to the environment controller at a plurality of transmission schedules. The one or more processors may also receive transitory data indicative of an interaction with the interactive device. Further, the one or more processors may determine a transmission schedule of the plurality of transmission schedules on which to transmit the transitory data. Further still, the one or more processors may transmit the transitory data on the transmission schedule along with a corresponding portion of the regularly monitored data to the environment controller.

In one embodiment, a method includes transmitting, via one or more processors of an interactive device, a first data set comprising a first type of information associated with the interactive device to an external controller on a first transmission schedule. The method also includes transmitting, via the one or more processors of the interactive device, a second data set comprising a second type of information associated with the interactive device to the external controller on a second transmission schedule. Further, the method includes receiving, via the one or more processors of the interactive device, an indication of an interaction between one or more guests and an interactive environment in which the interactive device is in use. Further still, the method includes determining, via the one or more processors of the interactive device, to transmit interaction information indicating the interaction on the first transmission schedule based on the indication, wherein the interaction information is not of the first type of information. Even further, the method includes transmitting, via the one or more processors of the interactive device, interaction information to the external controller on the first transmission schedule along with the first type of information.

In one embodiment, a system includes an environment controller that transmits a data packet comprising a plurality of device status updates. The system also includes a plurality of interactive devices and each interactive device of the plurality of interactive devices includes one or more processors, one or more memory devices, and communication circuitry. The plurality of interactive devices are communicatively coupled to the environment controller. The one or more processors of a respective interactive device may receive the data packet. The one or more processors may also determine a device status update of the plurality of the device status updates corresponding to the respective interactive device. Further, the one or more processors may receive an indication of an interaction between the respective interactive device and an interactive environment. Further still, the one or more processors may determine interaction information based on the indication. Further still, the one or more processors may modify the interaction information to generate a modified interaction information based on the device status update corresponding to the respective interactive device. Further still, the one or more processors may determine a transmission schedule to transmit the modified interaction information to the environment controller. Further still, the one or more processors may transmit the modified interaction information during one or more transmission events of the transmission schedule to the environment controller.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 2 is a block diagram illustrating the interactive device system of FIG. 1, in accordance with an aspect of the present disclosure;

DETAILED DESCRIPTION

Figure 1:
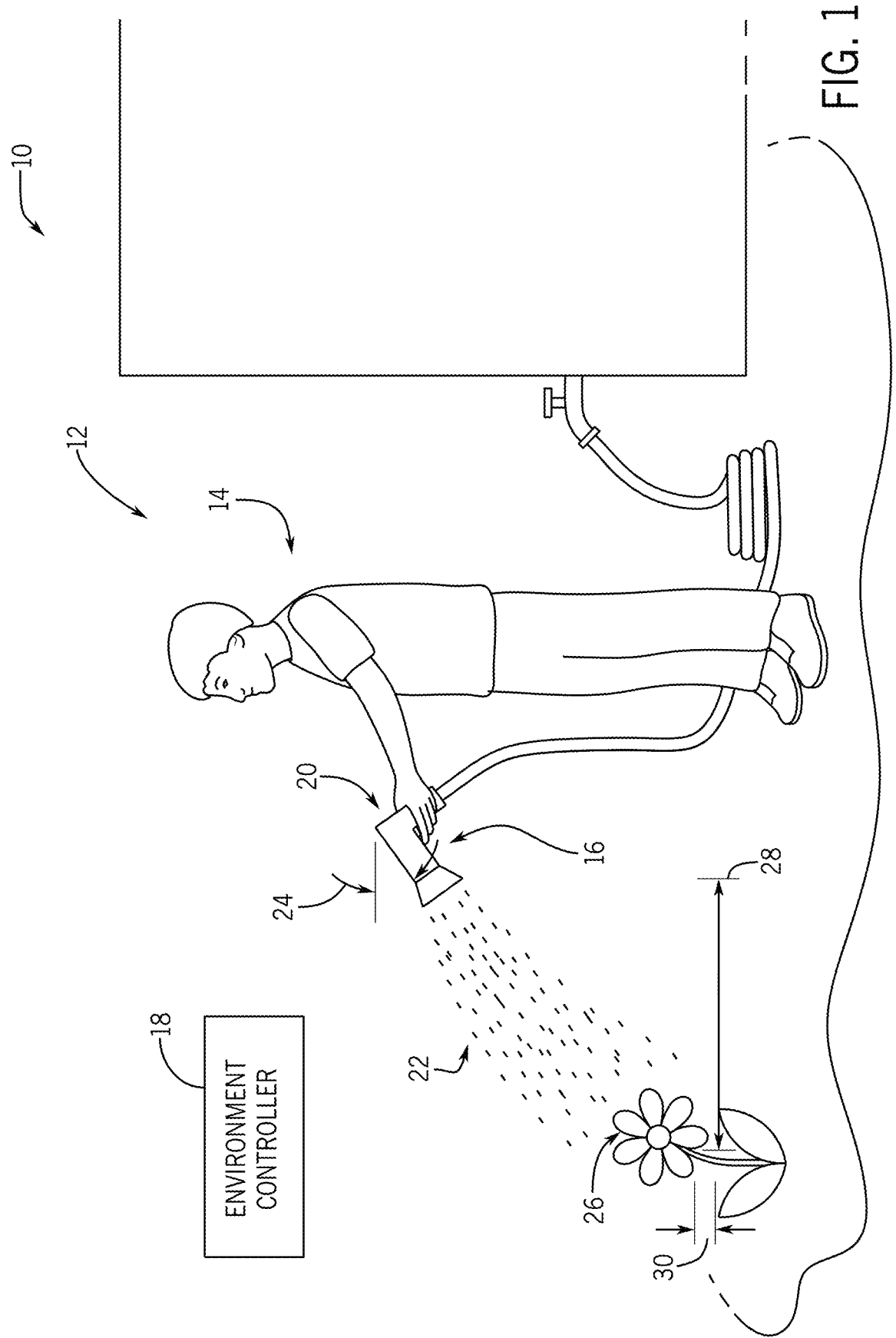
FIG. 1 is schematic diagram of an interactive device system for monitoring data associated with interactive devices and for providing customizable guest experiences, in accordance with an aspect of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In certain environments, such as an attraction within an amusement park (e.g., amusement park rides, performance shows, and games), a guest may be provided access to a tool to assist in providing an immersive experience within the amusement park. The guest's interactions with the tool may be recorded and provide certain benefits to the guest, such as awarding points. For example, the tool may transmit data to a control system of the amusement park to track the interactions between a guest and features of the amusement park. In the context of the amusement park, the control system may receive different types of data to monitor the interactions, monitor the status of the tool, data from multiple tools, and so on. Processing such data may utilize a relatively large amount of processing capabilities and memory, and thus it may be difficult to efficiently process the data to provide feedback to the guest of successful interactions, points awarded, and so on. To provide a more desirable experience (e.g., a more immersive experience or guest-friendly experience), it may be advantageous to control the scheduling of the data, such that the control system may process certain types of data more or less frequently.

The present disclosure relates to an interactive device system that manages data communication by an interactive device being utilized within an interactive environment of the amusement park. In some embodiments, the interactive device may be an interactive tool, such as a projectile launcher (e.g., a virtual projectile launcher), including a slingshot, a bow, a catapult, a blaster, water hose, or other device that is capable of emitting, shooting, or launching virtual and/or physical projectiles, wherein the virtual and/or physical projectiles may comprise virtual and/or physical kinetic outputs, fluids, energy, and/or lights, used in an interactive environment. In general, a controller may monitor certain data from multiple interactive devices. As described in further detail herein, the certain data may include regularly monitored data (e.g., device state data, position status data, orientation status data, and so on) and transitory data (e.g., data generated based on an interaction between the user and the interactive devices, such as pulling or activating a trigger or some other input). For example, the device state data may include data indicating a device health and/or utilization of the interactive device, such as a battery status, a memory usage, a computational storage capacity, a disk usage, a temperature, guest profile (e.g., user profile) linked to the interactive device, an error, and so on. The position status data may include data indicating a relative position of the interactive device within the interactive environment. The orientation status data may include data indicating how the user is holding the interactive device (e.g., a relative angle or tile of the interactive device), where a user is pointing or aiming the interactive device, and so on. In general, the position status data and/or orientation status data may be used to accurately determine how the user is utilizing the interactive device.

In any case, the interactive device may transmit the data (e.g., device state data, position status data, and/or orientation status data) to the controller, which in turn, uses the data to monitor the interactive devices. At least in some instances, the controller may monitor a relatively large number of interactive devices being utilized in the interactive environment. Further, the amount of data being transmitted by the interactive devices may be too large for the controller to process within a reasonable time scale that does not result in operational delays that can break immersion for the guests (e.g., users) of the interactive environment. Accordingly, it is presently recognized that it may be advantageous to transmit certain data (e.g., the interactive device state data, position status data, orientation status data) at different schedules (e.g., a relatively faster or slower intervals) to reduce or minimize the amount of data processed by the controller over a time period. Thus, present embodiments may improve computer operation, which may save costs and improve guest experiences.

That is, it is presently recognized that efficiencies in data transmission may be obtained by providing a regular transmission schedule for certain data (e.g., regularly monitored status data, such as battery status and positional status for interactive devices). Status data may include monitored information that is consistently available and consistently used. For example, interactive device state data such as a charging status (e.g., a level of charge) for a battery should always be available. As another example, location data (e.g., position status data and/or orientation status data) for a device should always be available. That is, such information should always be present because, for example, the battery always has some level of charge and the device always has a position. Further, such data may be consistently employed for system operations (e.g., tracking where an interactive blaster is pointed). However, what may be referred to herein as transitory data, such as interaction information (e.g., a trigger pull), may also be monitored. Such data may be monitored consistently but only used periodically. Indeed, interactions (e.g., a user pulling a trigger on a blaster, a user moving within range of a feature or target) do not consistently occur and thus, data indicating an interaction has occurred, may be considered transitory data. Accordingly, when there is no interaction, there is no need to transmit interaction information (e.g., a null data set). In fact, it is presently recognized that dedicating a scheduled transmission time for such information could create inefficient computer and system operation. In accordance with present embodiments, rather than transmitting the interaction information as it is generated, it is transmitted at one of the predetermined schedules, which makes it easier to prevent the controllers from receiving too much data at once. Further, transmitting the data at the predetermined schedules may enable the interactive devices to efficiently operate by not transmitting indications of a lack of the transitory data (e.g., the null data set). It is presently recognized that it may be advantageous to transmit transitory data (e.g., interaction information) along with status data (e.g., interactive device state data, position status data, and/or orientation status data). As an example, it may be advantageous to add periodically detected interaction information to scheduled transmissions of information relating to regularly monitored status data, such as position data, status data, orientation data, and device state data. Again, interaction data (or interaction information) may only be generated as a result of an interaction, and as such, present embodiments may avoid inefficiencies associated with transmitting interaction information on its own transmission schedule by piggybacking on a regular transmission.

In general, the interaction information may include data corresponding to the user using an interactive device (e.g., toy, blaster, handheld or wearable device (e.g., sword, wand, bat, club, wearable sensor, wearable emitter). For example, the interaction information may include data indicating that a trigger of the interactive device (e.g., projectile (e.g., virtual projectile, physical projectile) outputting (e.g., emitting, firing, shooting, throwing, launching, spraying) device) was pulled, a handheld or wearable device (e.g., sword, wand, bat, club, wearable sensor, wearable emitter) was displaced (e.g., waved, moved, shaken) and/or oriented (e.g., rotated, twisted), and/or other data indicating the guest used the interactive device to interact with features of the interactive environment. In an embodiment where the interactive device includes a trigger, it may be desirable to transmit trigger condition data indicating when and/or the manner in which the trigger was pulled to determine an interaction between the guest, the interactive device, and the interactive environment. Further, if the guest pulls or otherwise activates a trigger of the interactive device, it may be desirable to transmit a trigger condition (e.g., data indicating a trigger was pulled, a duration the trigger was held, and so on). It should be noted that it may be advantageous to transmit the position status data, orientation status data, and/or interactive device state data frequently (e.g., at predetermined intervals) to facilitate tracking of the interactive device. In contrast, as the interaction information can serve its purpose within the system when only transmitted as a result of the guest interacting with the interactive environment, and thus at irregular intervals, it may be advantageous to transmit the interaction information with the position status data, the orientation status data, the interactive device state data, or a combination thereof. In other words, room can be made in a scheduled transmission of the status data (e.g., position status data, orientation status data) to accommodate the transitory data (e.g., interaction information), which eliminates the need for a separately scheduled transmission or a potentially interrupting transmission.

For example, it may be advantageous to include the trigger condition of an interactive device (e.g., an interactive toy blaster) along with a transmission of status data that is scheduled for after a time at which the trigger condition is detected. As such, the control system may receive the trigger condition along with angular tilt data (or other position and/or orientation status data) that corresponds to the activation of the trigger (e.g., acquired within a close timeframe), and thereby reduce the amount of data transmitted by the interactive device (e.g., the interactive toy blaster) while still providing an accurate estimation of the angular tilt of the interactive device.

In some embodiments, the controller may transmit data packets on different transmission schedules (e.g., a first transmission schedule for a first data type, a second transmission schedule for a second data type). Further, a separate data transmission schedule may be utilized for transmitting data packets of a particular type for a plurality of devices. For example, in a system with interactive blasters as interactive devices, updated blaster states may be transmitted between one or more controllers and the interactive devices. That is, for example, such data may be transmitted to and/or from a number of interactive devices (e.g., blasters) and to and/or from one or more controllers. By communicating a single data packet for multiple interactive devices, the controller(s) may efficiently manage communication between a game engine operating with multiple interactive devices (e.g., greater than 25) as compared to communicating multiple data packets with information that corresponds to a single interactive device. As such, the interactive devices and/or controller(s) (e.g., game engine) are capable of scheduling transmissions of different types of information, and thus, managing certain processing operations that may be performed by the processors on each interactive device. In this way, the disclosed techniques reduce the amount of processing performed by the interactive devices and/or controller(s), thereby enabling the controller(s) to manage providing feedback related to the interactive devices more quickly, and for multiple interactive devices.

With the foregoing in mind, FIG. 1 is a schematic diagram showing a perspective view of an interactive environment 10 including an interactive device system 12, in accordance with an embodiment of the present disclosure. As shown, the interactive environment 10 includes a guest 14 holding an interactive device 16, which may be considered a component of the interactive device system 12. While only one guest 14 and one interactive device 16 are shown, another embodiment of the interactive device system 12 may include any number (e.g., one or more, two or more, three or more, four or more, five or more, and so on) of interactive devices 16 with any number (e.g., one or more, two or more, three or more, four or more, five or more, and so on) of guests 14.

In general, the interactive device 16 may include an electronic device having a processor and communication circuitry that communicates with an environment controller 18 (e.g., an external controller separate from and/or distinct from the interactive device 16) via wireless communication or wired communication, as described in more detail with respect to FIG. 2. In general, the environment controller 18 is also an electronic device (e.g., a computing device) having a processor and communication circuitry, such as a server, a desktop computer, a laptop, a mobile device, a smart phone, and the like. For example, the interactive device 16 may transmit signals indicating data to the environment controller 18 via antennas using ultra-wideband (UWB) communication (e.g., at a frequency between 3.1 gigahertz (GHz) to 10.6 GHZ), radio frequency identification (RFID) beacons and/or tags (e.g., at approximate frequencies of 433 megahertz (MHz) or 860-960 MHz), or Wi-Fi (e.g., at approximate frequencies of 2.4 GH/or 5 GHz). The interactive device 16 may include a trigger 20 (e.g., a button, switch, toggle, pull) that a guest 14 may select, pull, or otherwise activate, thereby causing the interactive device 16 to emit, shoot, or launch a projectile 22, such as a virtual projectile (e.g., a virtual laser beam, a virtual fluid stream, a virtual arrow, a virtual cannonball, and the like) or a physical projectile (e.g., a foam part, a fluid stream, and the like). In general, the interactive device 16 may include an interactive tool, such as a projectile launcher (e.g., a slingshot, a bow, a catapult), a blaster (e.g., a laser emitter), water hose, or any other suitable device that is capable of emitting, shooting, or launching virtual projectiles or physical projectiles, used in the interactive environment 10.

As described herein, it may be advantageous to regularly monitor certain data, such as location data (e.g., position status data and/or orientation status data). In some embodiments, the location data may include orientation status data indicating an orientation of the interactive device 16. For example, the orientation status data may indicate an angular tilt 24 (e.g., a roll, yaw, and/or pitch) of the interactive device 16 relative to one or more axes. In some embodiments, the orientation status data may indicate an amount of degrees the interactive device 16 is tilted to the left/right and/or up/down relative to a normal direction. Additionally or alternatively, the orientation status data may indicate a relative direction that the interactive device 16 is facing. For example, in an interactive environment 10 including one or more features, such as virtual features (e.g., characters or targets displayed on a screen or projected via augmented reality devices) or physical features (e.g., a physical target, other guests within the interactive environment, barriers, characters within the environment), the orientation status data may indicate a direction relative to the physical or virtual features. The relative direction may indicate whether a particular end (e.g., a representative projectile firing end) of the interactive device 16 is aiming at one or more of the features. Then, the interactive device 16 may transmit signals indicating orientation status data indicating the tilt 24, as well as position status data, to the environment controller 18.

Additionally or alternatively, it may be advantageous to regularly monitor position status data. In general, the position status data may indicate a relative position of the interactive device 16 within the interactive environment. For example, the processor may determine three-dimensional Cartesian coordinates, polar coordinates, and the like, of the interactive device 16. In some embodiments, the position status data may include a location within the interactive environment 10 of where the interactive device 16 is being utilized (e.g., fired or aimed). For example, the location may correspond to a safety or no-firing zone (e.g., having virtual characters that it is intended that the guest 14 not aim or fire a projectile 22 towards), a zone with barriers (e.g., physical barriers or virtual barriers) that reflect or deflect projectiles 22, and the like.

In some embodiments, the environment controller 18 may adjust operation of the interactive device 16 using the position status data such that interactive device 16 operates differently in different zones. For example, the environment controller 18 may receive an updated position status data that indicates the guest 14 moved the interactive device 16 from a first zone or location within the interactive environment 10 to a second zone or location within the interactive environment 10. In turn, the environment controller 18 may update game information indicating the guest's progress through the interactive environment 10. It is presently recognized that it may be advantageous to incentivize the guest 14 to continue progressing (e.g., moving from the first zone to the second zone, the second zone to the third zone, and so on) through the interactive environment 10. For example, the environment controller 18 may determine that the guest 14 has returned to a previous zone (e.g., the guest has returned to the first zone from the second zone) and/or has remained in the first zone for longer than a time threshold. To prevent overcrowding or otherwise negatively effecting the experience of the guest(s) 14, the environment controller 18 may provide feedback to the guest 14 using features 26 and/or adjust operation of the interactive device 16, as discussed below.

For example, to encourage the guest 14 to progress through the interactive environment 10, the environment controller 18 may transmit a device status update 128 that causes the interactive device 16 to operate in accordance with a less advantageous and/or weakened "nerfed" operational mode (e.g., underpowered (e.g., lower damage, lower score), reduced powered, or otherwise disadvantageous operational mode). The device status update 128 may prevent the interactive device 16 from firing, operating in accordance with a "shaky mode" (e.g., reduced accuracy mode), or otherwise prevent the interactive device 16 from operating normally. Once the guest 14 returns to the second zone or progresses to the third zone, the environment controller 18 may transmit a device status update that causes the interactive device 16 to operate normally. Additionally or alternatively, the device status update may cause the interactive device 16 to provide feedback (e.g., via the feedback device 38) to the guest 14 that indicates the guest 14 should progress to a particular zone or otherwise continue progressing through the interactive environment 10. For example, the environment controller 18 may cause a character within the interactive environment 10 to display text and/or output audio that encourages the guest 14 to progress through the interactive environment 10. For example, the environment controller 18 may cause the character to shake their head, display a positive message such as "good work! This area is secured", or a negative message such as "there's too many of them! Retreat!" In this way, the environment controller 18 may use the position status data of the interactive device 16 to prevent guests 14 from remaining in the interactive environment 10 for relatively long periods of time or otherwise overcrowding the interactive environment 10.

In any case, the interactive device 16 may communicate one or more signals indicating the position status data and/or the orientation status data to the environment controller 18 (e.g., via a transceiver of the interactive device 16). In turn, the environment controller 18 may update the interactive system 10 based on the position status data and/or orientation status data corresponding to the position and/or the orientation of the interactive device 16. For example, in an embodiment when the interactive device 16 is a projectile launcher, the environment controller 18 may determine whether the interactive device 16 is aiming towards a feature 26 (e.g., a target) based on the angular tilt 24 and/or a distance 28 between the interactive device 16 and the feature 26. As another non-limiting example, the environment controller 18 may determine whether the projectile 22 corresponding to the interactive device 16 will hit a portion 30 of the feature 26. In any case, interactions between the guest 14 and the interactive device 16 and/or features 26 within the interactive environment 10 may be tracked and/or recorded, such as by updating data stored in a databases or other accessible storage components, to include a record of the interactions with the interactive device 16, awarding points to the guest 14 based on using the interactive device 16, tracking progress of the guest 14 when using the interactive device 16, tracking achievements of the guest 14 when using the interactive device 16, and the like.

To perform the operations described herein, the interactive device 16 and the environment controller 18 may each include certain processing circuitry, memory circuitry, and communication circuitry. To illustrate, FIG. 2 is a block diagram of the interactive device system 12 including one or more interactive devices 16 and the environment controller 18. In an embodiment, the one or more interactive devices 16 may each include a processor 32 (representative of one or more processors), a memory 34 (representative of one or more memories), and communication circuitry 36 to enable the one or more interactive devices 16 to communicate with the environment controller 18. The various functional blocks shown in FIG. 2 may include hardware elements (including circuitry), software elements (including machine-executable instructions) or a combination of both hardware and software elements (which may be referred to as logic). The interactive device 16, memory 34 and/or nonvolatile storage, the communication circuitry 36, and/or the feedback device 38 may each be communicatively coupled directly or indirectly (e.g., through or via another component, a communication bus, a network) to one another to transmit and/or receive signals indicating data between one another. It should be noted that FIG. 2 is merely one example of a particular implementation and is intended to illustrate the types of components that may be present in the interactive device 16 and/or the environment controller 18.

The interactive device 16 may also include a game input/output control element 40 (representing one or more such control elements), which may include an input trigger (e.g., the trigger 20 described in FIG. 1), button, joystick, control pad, or other selectable features, and/or similar features as the feedback device 38 (e.g., speaker, display, light-emitting device, haptic device, and so on). The game input/output 40 may provide a trigger condition to the environment controller 18 that causes the environment controller 18 to track the position and/or orientation of the interactive device 16, which may facilitate certain game elements within an interactive environment 10. In general, the trigger condition may indicate interactions between the guest and the interactive device 16. For example, the trigger condition may indicate whether a guest is pulling the trigger 20 (e.g., the trigger 20 described with respect to FIG. 1) of the interactive device 16 (e.g., in an embodiment where the interactive device 16 is a projectile launcher), how long the trigger 20 was pulled, and/or how many times the trigger 20 was pulled over a predetermined time interval (e.g., 0.5 seconds(s), 1 s, 2 s, 5 s, and so on). As another non-limiting example, the trigger condition may indicate a direction of movement or a particular motion of the interactive device 16 (e.g., a guest waving a wand in a specific pattern). As another non-limiting example, the trigger condition may indicate that the guest is pressing a particular button of the game input/output 40. In this way, the trigger condition may be utilized by the environment controller 18 to enable tracking of the interactive device 16.

The communication circuitry 36 may include, for example, communication circuitry 36 (e.g., one or more communication devices or circuits) for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the communication circuitry 36 may include one or more communication circuitry for using a cellular communication standard of the 5G specifications that include the millimeter wave (mmWave) frequency range (e.g., 24.25-300 gigahertz (GHz)) that defines and/or enables frequency ranges used for wireless communication. In some embodiments, the communication circuitry 36 may include a transmitter and/or receiver that support transmission and receipt of various wireless signals via one or more antennas. For example, the communication circuitry 36 may include multiple transmitters, multiple receivers, multiple transceivers, and/or multiple antennas as suitable for various communication standards.

As illustrated, the interactive device 16 may include a transceiver 42. In some embodiments, all or portions of the transceiver 42 may be disposed within the interactive device 16. The transceiver 42 may support transmission and receipt of various wireless signals (e.g., regularly monitored data and/or transitory data) via one or more antennas 44, and thus may include a transmitter 46 and a receiver 48. Accordingly, the transceiver 42, the transmitter 46, and the receiver 48 may receive signals via one or more of the antennas 50. In general, the transmitter 46 and the receiver 48 may enable communication with the environment controller 18.

The environment controller 18 may include a processor 52 (representative of one or more processors), a memory 54 (representative of one or more memories), and communication circuitry 56 to enable the environment controller 18 to communicate with the one or more interactive devices 16. In an embodiment, the environment controller 18 may scan (e.g., periodically or based on certain trigger conditions, such as activation of the trigger 20 of the interactive device 16, and so on) for and/or transmit a signal that includes the signal to the interactive device 16. The environment controller 18 may include a transceiver 58. In some embodiments, all or portions of the transceiver 42 may be disposed within the processor 52. The transceiver 58 may support transmission and receipt of various wireless signals (e.g., regularly monitored data and/or transitory data) via one or more antennas 60, and thus may include a transmitter 62 and a receiver 64. Accordingly, the transceiver 58, the transmitter 62, and the receiver 64 may receive signals via one or more of the antennas 60. In general, the transmitter 62 and the receiver 64 may enable communication with the interactive device 16.

As illustrated, the memory 34 of the interactive device 16 may include interactive device state data 70, position status data 72, orientation status data 74, and an interactive device ID 76. As described herein, the interactive device state data 70 may include a battery status, memory usage, a computational storage capacity, a disk usage, a temperature, a guest profile linked to the interactive device, an error, and so on. In some embodiments, the position status data 72 may include three-dimensional Cartesian coordinates, polar coordinates. Further, the orientation status data 74 may include roll, yaw, and/or pitch information, such as data indicating a tilt of the interactive device 16 (e.g., a degree of inversion or twist of the device relative to a neutral position). For example, in some embodiments, the position status data 72 and/or orientation status data 74 may include data indicating receipt of signals from the environment controller 18. That is, the interactive device 16 may determine a time of flight corresponding to a time when a signal was sent by the antenna 60 and/or received by each of the antennas 44. Accordingly, the time of flight may vary based on a distance between the antenna 60 and each antenna 44. As such, the time of flight for each of the antennas 44 may correspond to or otherwise be related to a particular position and/or orientation of the interactive device 16. In some embodiments, the interactive device 16 may determine the time of flight of the signal using timestamps corresponding to sending and receiving the signal. In general, the interactive device ID 76 may include a set of alphanumeric characters and/or symbols that identify a particular interactive device 16 (e.g., interactive device ID). Accordingly, the interactive device state data 70, the position status data 72, the orientation status data 74, the interactive device ID 76, or a combination thereof, may be used to monitor use and a status of the interactive device 16.

As illustrated, the memory 54 of the environment controller 18 may include game information 68. In general, the game information 68 may include information such as user profiles currently linked to interactive devices, points achieved by the guests 14, and the like. As described herein, the game information 68 may be used to track a guest's 14 interactions in the interactive environment 10, such as a number of targets hit, a current projectile or firing mode of the interactive device 16, power-ups associated with the interactive device, and the like.

At least in some instances, it may be advantageous to communicate the interactive device state data 70 to the environment controller 18 to aid tracking and managing one or multiple interactive devices 16. For example, the environment controller 18 may determine whether an interactive device 16 should be charged if the battery status is below a battery status threshold, the interactive device 16 should be removed from the interactive environment 10 for maintenance if the temperature is above a temperature threshold, and so on. As another non-limiting example, the interactive device state data 70 may indicate a particular mode of the interactive device 16, such as a power-up mode, a stuck trigger mode, a rapid-fire mode, a slime-mode (e.g., where virtual slime is a projectile), and so on. In any case, the mode may cause the interactive devices 16 to transmit modified information, such as position status data 72 that includes random noise, data indicating a trigger 20 was pulled multiple times (e.g., 2 or more, 3 or more, 4 or more) despite the trigger 20 being activated fewer times (e.g., 1, 2, 3), information to change how the virtual projectile is displayed (e.g., displaying a slime ball instead of a virtual projectile indicated in the guest's profile). At least in some instances, the interactive device 16 of the interactive device 16 may update the interactive device state data 70 based on a device status update transmitted by the environment controller 18, as described in more detail with respect to FIG. 5.

In an embodiment, the environment controller 18 may determine an interaction between the interactive device 16 and the guest 14, and in turn, transmit, output, or otherwise provide an indication that causes the interactive device 16 to provide feedback indicating the interaction. That is, the indication may cause one or more feedback devices 38 (e.g., visual feedback devices (e.g., light-emitting elements such as diodes, a display screen), audio feedback devices (e.g., speakers), haptic elements, and the like) of the interactive device 16 to activate based on the position status data 72, the orientation status data 74, or a combination thereof, received by the environment controller 18. In some embodiments, the memory 54 may store a guest profile including certain guest preferences (e.g., graphics, images, and other visuals, audio, and haptics patterns that the guest has previously selected) that the guest may provide to improve immersion of the guest with an interactive environment. For example, the guest may prefer that the interactive device 16 present a particular color scheme (e.g., blue), and a light emitter(s) (representative of the feedback device 38) on the interactive device 16 may illuminate in a color (e.g., blue) that corresponds to the color scheme upon a successful hit or the interactive device 16 aiming at a feature (e.g., red if aiming at a friendly character within the interactive environment, or green if aiming at a target for awarding points), as described herein.

Figure 3:
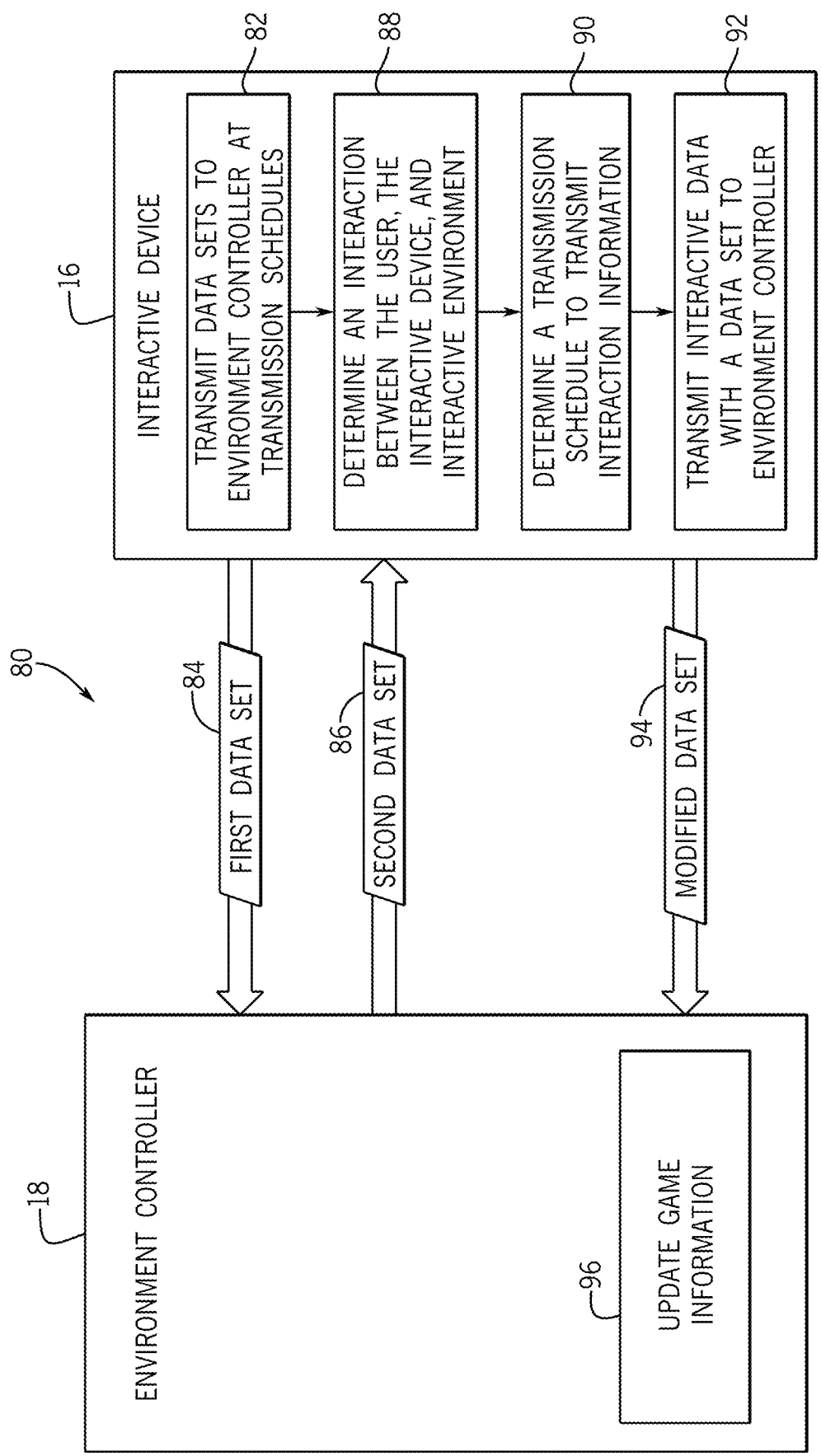
FIG. 3 is a data flow diagram illustrating an interactive device determining a scheduled transmission to communicate transitory data to an environment controller of the interactive device system of FIG. 1, in accordance with an aspect of the present disclosure.

As discussed above, it may be advantageous to add periodically detected interaction information to a scheduled transmission relating to regularly monitored data. To further illustrate the techniques disclosed herein, FIG. 3 is a data flow diagram illustrating a process 80 for determining a transmission event to transmit transitory data (e.g., interaction information) from the interactive device 16 to an environment controller 18. In general, certain process blocks performed in the process 80 may be performed by particular components, such as the processor 32 of the interactive device(s) 16 and/or the processor 52 of the environment controller 18. However, for simplicity, the actions described below are being described with respect to the interactive device 16 rather than the processor 32, and the environment controller 18 rather than the processor 52. Moreover, certain process blocks may be performed in a different order than that illustrated, and, indeed, in some embodiments, certain process blocks may be skipped altogether.

As shown in the illustrated embodiment, the interactive device 16 may, at block 82, transmit multiple data sets, such as a first data set 84 (e.g., a first data packet) and a second data set 86 (e.g., a second data packet), to the environment controller 18. In general, the first data set 84 and the second data set 86 may include regularly monitored status data, such as interactive device state data 70, position status data 72, orientation status data 74, an interactive device ID 76, or a combination thereof. For example, the interactive device 16 may transmit the first data set 84 at a first transmission schedule (e.g., transmit at 10 Hertz (Hz), 15 Hz, 25 Hz, 50 Hz, and so on). Additionally, the interactive device 16 may transmit the second data set 86 at a second transmission schedule (e.g., transmit at 200 Hz, 150 Hz, 100 Hz, 50 Hz, 10 Hz, and so on) different from the first transmission schedule. As referred to herein, a "transmission schedule" includes multiple transmission events that each occur at different time period based on the frequency. In this way, a control system that monitors the interactive device(s) 16 can process certain types of information more frequently than others, thereby providing increased or reduced processing capabilities when it is desirable.

As illustrated, at block 88, the interactive device 16 determines an interaction between the guest 14, the interactive device 16, and/or the interactive environment 10. In general, determining the interaction may include the interactive device 16 receiving input indicating that an interaction was performed with the interactive device 16, such as the guest 14 pulling the trigger 20. In such an embodiment, the interactive device 16 may determine interaction information related to the pulling of the trigger 20, such as a trigger condition. The trigger condition may generally include information indicating the manner in which the guest 14 pulled the trigger 20. For example, the trigger condition may indicate a duration the trigger 20 was held, the number of times the trigger 20 was pulled within a time frame (e.g., indicating a rapid fire), whether the trigger was held and subsequently released (e.g., indicating the user is charging a projectile fire from the interactive device 16).

As one non-limiting example, the interactive device 16 may compare the duration the trigger 20 was held to one or more duration thresholds to determine a corresponding virtual projectile. If the duration is less than a first threshold (e.g., 300 milliseconds (ms) or less, 250 ms or less, 200 ms or less, 150 ms or less, and so on), the interactive device 16 may determine the interaction indicates a virtual projectile corresponding to a normal blast should be displayed to the guest. If the duration is greater than the first threshold, (e.g., 300 ms or greater, 400 ms or greater, 1 s or greater, and so on), the interactive device 16 may determine the interaction indicates a virtual projectile corresponding to a charged blast should be displayed to the guest 14.

Additionally or alternatively, the interactive device 16 may compare the duration the trigger 20 was held to one or more duration thresholds to determine a corresponding virtual projectile type or fire rate. For example, if the duration is less than a second threshold, the interactive device 16 may determine the interaction indicates an automatic firing of virtual projectiles should be displayed to the guest 14. If the duration is greater than the second threshold, the interactive device may determine the interaction indicates a charged blast should be displayed to the guest. It should be appreciated that the duration the trigger 20 was held may also be used to display other types of fire rates and/or projectile types, such as automatic blasts, burst fire, and/or alternative projectile (e.g., ammo) types. Accordingly, at least in some embodiments, there may not be a one to one correspondence between the number of times the trigger 20 was pulled and the number of projectiles fired by the interactive device 16. In any case, the interactive device 16 may determine to transmit interaction information that indicates the type of projectile firing based on the trigger condition. In some embodiments, the interaction information may indicate a direction of movement or a particular motion of the interactive device 16 towards any features 26 of the interactive environment, a specific pattern, and so on.

As shown in the illustrated embodiment, in process block 90, the interactive device 16 determines a transmission schedule of the transmission schedules to transmit interaction information (e.g., the trigger condition). In general, the interactive device 16 may determine to transmit the interaction information at one of the existing transmission schedules corresponding to the first data set 84 or the second data set 86. In some embodiments, the interactive device 16 may determine the next or subsequent transmission event based on earliest availability of bandwidth. As such, the interactive device 16 may determine to transmit the interaction information at one or more subsequently occurring transmission events of the transmission event corresponding to the next occurring transmission event.

As shown in the illustrated embodiment, the interactive device 16, at block 92, transmits the interaction information in accordance with one of the transmission schedules of the interactive device. In general, the interactive device 16 may transmit the modified data set 94 during one or more subsequently occurring transmission events of the transmission schedule determined at block 90. Put differently, the interactive device 16 may transmit the modified data set 94 at a particular transmission schedule instead of the information that was previously transmitted at the transmission schedule (e.g., only the first data set 84 and/or the second data set 86). In some embodiments, the interactive device 16 may transmit the modified data set for one or more additional transmission events at the determined transmission schedule, which may reduce the likelihood that the interaction information is not received by the environment controller 18.

As shown in the illustrated embodiment, at process block 96, the environment controller 18 may update game information 68 based on the modified data set 94. In general, updating the game information 68 may include adjusting certain features 26, awarding points (e.g., updating information stored in a database), causing the feedback devices 38 to activate, or transmitting notifications to a guest device (e.g., a mobile device). In some embodiments, updating the game information 68 may include transmitting a device status update that adjusts operation of the interactive device 16, as described in more detail with respect to FIG. 5. As such the process 80 may be used to transmit transitory data (e.g., interaction information) by adding the transitory data to existing data transmission schedules. In this way, the process 80 may reduce or prevent interruption of data transmission and improve the computational resources of the environment controller 18 and/or interactive devices 16, as described herein.

Figure 4:
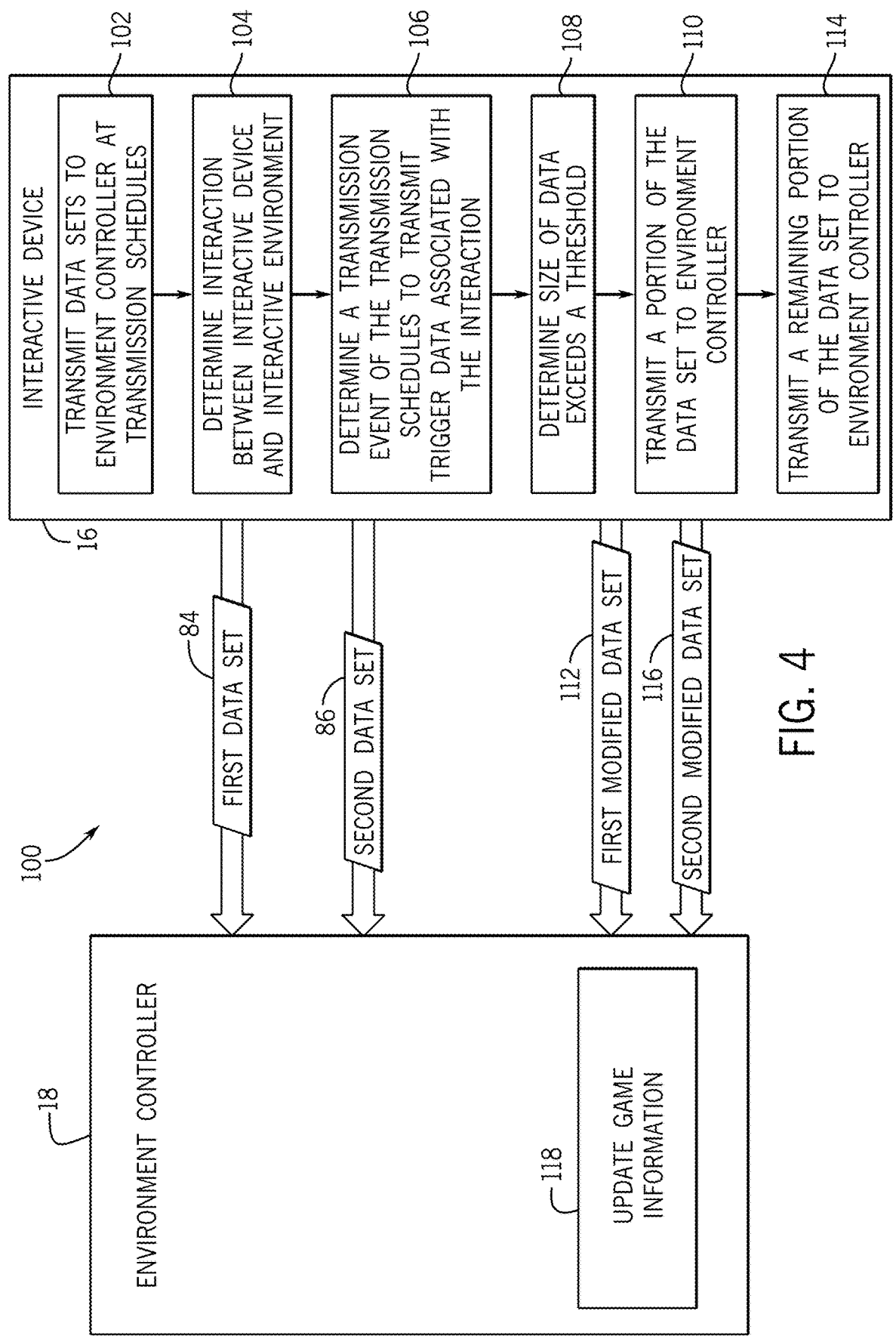
FIG. 4 is a data flow diagram illustrating an interactive device communicating transitory data using multiple transmission events, in accordance with an aspect of the present disclosure.

As described herein, the interactive device 16 may transmit a portion of interaction information or otherwise divide or split the interaction information and transmit the portions at different transmission events. It is presently recognized that transmitting interaction information at different transmission events may further prevent the environment controller 18 from receiving more data than the environment controller 18 is capable of processing over a particular time interval. To further illustrate the techniques disclosed herein, FIG. 4 is a data flow diagram illustrating a process 100 for splitting interaction information and transmitting each portion of the interaction information at different transmission events. In general, certain process blocks performed in the process 100 may be performed by particular components, such as the processor 32 of the interactive device(s) 16 and/or the processor 52 of the environment controller 18. However, for simplicity, the actions described below are being described with respect to the interactive device 16 rather than the processor 32, and the environment controller 18 rather than the processor 52. Moreover, certain process blocks may be performed in a different order than that illustrated, and, indeed, in some embodiments, certain process blocks may be skipped altogether.

As illustrated, the interactive device 16, at block 102, transmits data sets (e.g., the first data set 84 and the second data set 86) to the environment controller on transmission schedules. In general, the interactive device 16 may perform block 102 in a generally similar manner as described with respect to block 82 of FIG. 3. For example, the interactive device 16 may transmit the first data set 84 at a first transmission schedule and a second data set 86 at a second transmission schedule. At block 104, the interactive device 16 determines an interaction between the interactive device 16 and the interactive environment 10. In general, the interactive device 16 may perform block 104 in a generally similar manner as described with respect to block 88 of FIG. 3. At block 106, the interactive device 16 determines a transmission event of the transmission schedule to transmit data based on the trigger indication. In general, the interactive device 16 may perform block 106 in a generally similar manner as described with respect to block 90 of FIG. 3.

At block 108, the interactive device 16 determines the size of the data indicating the interaction (e.g., the interaction information) exceeds a threshold. In general, the threshold may correspond to a maximum amount of data for a data packet to be transmitted. As such, the interactive device 16 may determine a size of the interaction information and compare the size of the interaction information to the threshold. If the size of the interaction information exceeds the threshold, then the interactive device 16 may proceed to block 110. However, if the size of the interaction information is below or equal to the threshold, then the interactive device 16 may transmit modified data set 94 in a generally similar manner as described with respect to block 92 of FIG. 3.

At block 110, the interactive device 16 transmits a portion of the data set to the environment controller 18. In general, the interactive device 16 may transmit a first modified data set 112 that includes a first portion (e.g., less than 100%, 90% or less, 80% or less, 50% or less) of the interaction information. For example, the interactive device 16, at block 108, may determine that the threshold is 50 Bytes, the first data set 84 is 30 Bytes, and the interaction information is 30 Bytes. As such, the interactive device 16 may determine to transmit, at most, 20 Bytes of the 30 Bytes of the interaction information in a first transmission event. In some embodiments, the interactive device 16 may determine the next or subsequent transmission event based on earliest availability of bandwidth. Then, at block 114, the interactive device 16 transmits a second modified data set 116 that is a remaining portion (e.g., the remaining 10 Bytes in this example) of the interaction information in a second transmission event that follows the first transmission event. At block 118, the environment controller 18 updates game information based on the first modified data set 112, the second modified data set 116 or both. In general, the environment controller 18 may perform block 118 in a generally similar manner as block 96 as described in FIG. 3.

Figure 5:
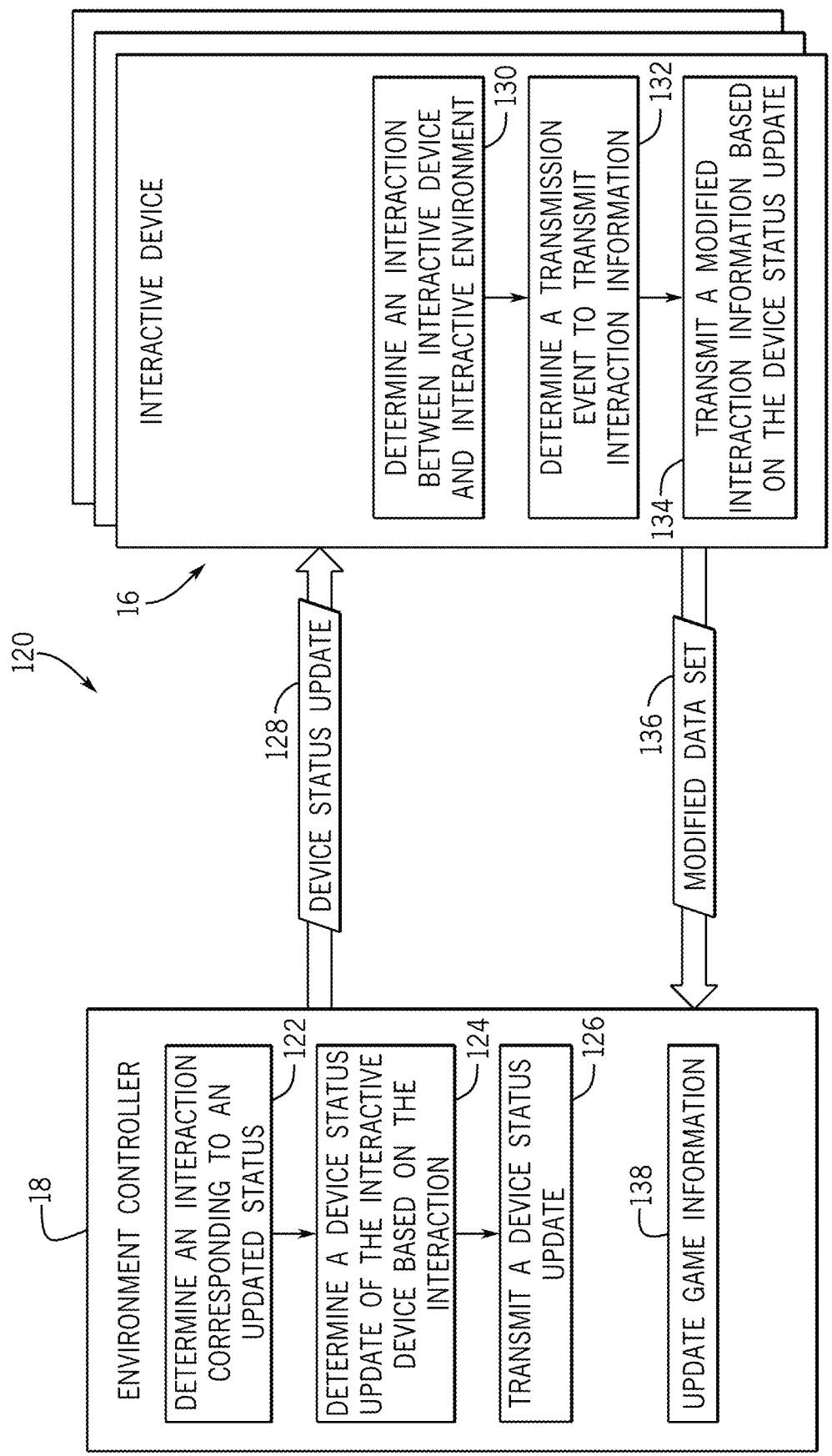
FIG. 5 is a data flow diagram illustrating an interactive device communicating modified data to an environment controller based on a received device status of the interactive device, in accordance with an aspect of the present disclosure.

As described herein, the environment controller 18 may be capable of adjusting the amount of data transmitted by the interactive devices 16. To further illustrate the techniques disclosed herein, FIG. 5 is a data flow diagram illustrating a process 120 for tracking position status data 72 and orientation status data 74 of an interactive device 16. In general, certain process blocks performed in the process 120 may be performed by particular components, such as the processor 32 of the interactive device(s) 16 and/or the processor 52 of the environment controller 18. However, for simplicity, the actions described below are being described with respect to the interactive device 16 rather than the processor 32, and the environment controller 18 rather than the processor 52. Moreover, certain process blocks may be performed in a different order than that illustrated, and, indeed, in some embodiments, certain process blocks may be skipped altogether.

As shown, the environment controller 18, at block 122, determines an interaction that occurred between the interactive device 16, the interactive environment 10, and/or the guest that corresponds to an updated status of one or more interactive devices 16. In general, the environment controller 18 may determine whether the game information 68 indicates an interaction has occurred that corresponds to updating information associated with one or more interactive devices 16. In some embodiments, the interactive device 16 may determine the interaction based on a previously received data set (e.g., the first data set 84 and/or the second data set 86 as described with respect to FIGS. 3 and 4) indicating interaction information, such as the guest shooting (e.g., pulling a trigger while aiming at), physically contacting, or moving with a threshold range of a feature 26 (e.g., a physical feature or a virtual feature) corresponding to a power-up, nerf, or otherwise modified effect of the projectile 22. For example, the environment controller 18 may receive a modified data set 94 including interaction information corresponding to the guest pulling the trigger 20 on the interactive device 16. Further, the environment controller 18 may receive position status data 72 and/or orientation status data 74 to determine a feature 26 that the interactive device 16 was aiming at when the trigger pulled. In some embodiments, the environment controller 18 may utilize one or more previous and/or one or more subsequently transmitted position status data 72 and/or orientation status data 74 to determine the feature 26 shot by the interactive device 16. For example, the environment controller 18 may access one, two, three, or more than three, previous and/or subsequent position status data 72 and/or orientation status data 74. Accordingly, the environment controller 18 may determine an average position and/or orientation, an interpolated position and/or orientation, and/or an extrapolated position and or orientation corresponding to the interactive device 16.

In some embodiments, the interaction includes the interactive device 16 moving within a threshold range of a feature 26. As described herein, the feature 26 may be a virtual or physical object that corresponds to a power-up, nerf, or otherwise modified effect of the projectile 22. For example, the feature 26 corresponding to the power-up may be a block representing a block of projectiles (e.g., missiles) that is physically present along a path through the interactive environment 10. As another non-limiting example, the feature 26 corresponding to the power-up may be a virtual box of water balloons. In any case, the guest may desire to "collect" a particular power-up by moving towards the feature 26 corresponding to the power-up. The environment controller 18 may receive position status data 72 of the interactive device 16 and determine whether the position status data of the interactive device 16 is within the threshold range from a position corresponding to the feature 26. If the environment controller 18 determines the interactive device 16 is within the threshold range from the position corresponding to the feature 26, the environment controller 18 may transmit a device status update 128 corresponding to a mode. In some embodiments, the environment controller 18 may transmit the device status update 128 when the environment controller 18 determines the interactive device 16 has interacted with a threshold number (e.g., 2, 3, 4, 5, 6, or greater than 6) of features. In embodiments when the interactive device 16 is a blaster, the device status update 128 may cause the interactive device 16 to provide feedback representing the interactive device 16 being loaded with a projectile (e.g., projectile type (e.g., ammunition (ammo) (e.g., ammo type))) corresponding to the power-up. The "loading" may include depicting the projectile on a display of the interactive device 16 along with adjusting haptic, audio, and other visual effects (e.g., changing the reticle and/or depicting the projectile as it is virtually launched from the blaster).

As shown, the environment controller 18, at block 124, determines a device status update of one or more interactive devices 16 based on the interaction information. In general, the environment controller 18 may determine a device status update that corresponds to the interaction information by querying a reference information, such as a table or otherwise. In some embodiments, the device status update may indicate a mode adjustment for an interactive device 16. As described in more detail herein, the mode may cause the interactive device 16 to transmit a different amount of information or change the information transmitted.

At block 126, the environment controller 18 transmits a device status update 128 to the interactive device 16, thereby causing the interactive device 16 to operate in accordance with the device status update. In general, the device status update may adjust subsequent interaction information transmitted by the interactive device 16. For example, the device status update may cause the interactive device 16 to transmit information indicating a mode corresponding to the device status update. In general, the mode may include instructions that causes the interactive device 16 to modify transitory data, regularly monitored data and/or transmit addition information to provide the user with an immersive experience related to interactions with the features 26 of the interactive environment 10. For example, the interactive device 16 may receive a device status update corresponding to modes that reduce the accuracy of the blaster (e.g., a shaky mode) by incorporating noise into the position status data 72 and/or orientation status data 74. As such, interactive device 16 may transmit a device status identifier (e.g., shaky mode identifier) to the environment controller 18. In turn, the environment controller 18 may determine a noise adjustment (e.g., modifying one or more directions indicated in the position status data 72 by a random number) upon receipt of the device status update and apply the noise adjustment to the position status data 72 and/or orientation status data 74 of the interactive device 16. In some embodiments, the processor 32 of the interactive device 16 may be capable of determining the noise adjustment and applying the noise adjustment to the position status data 72 and/or orientation status 74 before it is transmitted to the environment controller 18.

In some embodiments, the mode may be selectable by the guest 14 operating the interactive device 16. For example, the environment controller 18 may transmit the device status update 128 corresponding to a particular mode or projectile type. In turn, the memory 34 of the interactive device 16 may update device state data 70 to include the particular mode or projectile type. The guest 14 may select the mode from multiple selectable modes (e.g., using a graphic user interface on the interactive device 16 or a personal electronic device, such as a mobile device, a smart phone, and the like) when the guest 14 desires to utilize the particular mode. In some embodiments, the memory 34 or other suitable memory may store two or more (e.g., 2, 3, 4, 5, or more than 6) types of ammo that may be ready to use. In such an embodiment, the interactive device 16 may include buttons (e.g., triggers 20) that enable the guest 14 to shoot a first type of ammo, a second type of ammo, or both. For example, the interactive device 16 may have a first trigger 20 to shoot a first type of ammo and a second trigger 20 to shoot a second type of ammo. It is presently recognized that this may give the guest 14 the experience of loading different projectile types (e.g., ammo) into the interactive device 16. Further, the feedback devices 38 may activate to indicate the selected projectile type and/or mode, such as by adjusting haptics, audio (e.g., outputting audio indicating a newly selected projectile), visual effects (e.g., changing a reticle type or color, depicting the selected projectile type as the projectile 22 on a display, and the like). In this way, the device status update 128 may provide different or unique guest experiences for each guest based on guest input. Additionally or alternatively, the device status update 128 may automatically cause the interactive device 16 to operate in accordance with the mode.

In some embodiments, the environment controller 18 may transmit the device status update 128 based on the guest's progress through the interactive environment 10. For example, the environment controller 18 may determine that the guest 14 and/or the guest's 14 team have achieved a threshold number score (e.g., corresponding to targets hit) or exceeded a time limit in a first zone. As such, the environment controller 18 may transmit a feedback or a device status update 128 that encourages the guest 14 to progress to a second zone. For example, the device status update 128 may prevent the interactive device 16 from firing, adjusting the mode of the interactive device 16, or providing feedback to the guest 14 that encourages the guest 14 to move to a next zone. In some embodiments, the environment controller 18 may transmit the device status update 128 based on the position status data. For example, the environment controller 18 may track the guest's 14 position as the guest progresses (e.g., moves along a moving walkway and/or the guest 14 walks to different locations) within the interactive environment 10. As such, the environment controller 18 may transmit a device status update 128 when the guest 14 enters a new zone. In this way, the environment controller 18 may use the device status update 128 to manage the number of guests 14 within particular zones or areas of the interactive environment 10.

As illustrated, the interactive device 16, at block 130, determines an interaction between the interactive device 16, the interactive environment 10, and the guest 14. In general, the interactive device 16 may perform block 130 in a generally similar manner as block 88 described with respect to FIG. 3. Additionally, at block 130, the interactive device 16 may determine an interaction using the device status update. For example, the interactive device 16 may determine that the trigger 20 was pulled and also determine that the device status update indicates that the interactive device 16 is firing in a "shaky mode." At block 132, the interactive device 16 may determine a transmission event to transmit the interaction information modified based on the device status update 128. In general, the interactive device 16 may perform block 132 in a generally similar manner as block 90 described with respect to FIG. 3. However, it should be noted that the interactive device 16 is determining to transmit interaction information that is modified based on the device status update 128. In other words, the interactive device 16 is determining a transmission event to transmit a modified interaction information, which may include relatively more data and/or altered data than would otherwise be transmitted without the device status update. At block 134, the interactive device 16 transmits the modified data set 136. At block 138, the environment controller 18 updates game information based on the modified data set 136. In general, the environment controller 18 may perform block 138 in a generally similar manner as described with respect to block 90 of FIG. 3. In this way, the process 120 may be used to adjust the amount of data transmitted by the interactive device(s) 16 during transmission events based on a device update status.

As one non-limiting example, the mode may include a "power-up mode." In a generally similar manner as described with respect to the "shaky mode", the "power-up mode" may alter and/or add to the data transmitted by the interactive device 16. However, the "power-up" mode may generally provide certain benefits by making projectiles fired by the interactive device 16 appear more powerful (e.g., the virtual projectile may appear larger, award more points, hit more targets, and so on), more accurate (e.g., adjust the projectile fired by the interactive device 16 such that it is more likely to hit a target), and the like. In any case, if the environment controller 18 determines that interactive device 16 interacted with the feature 26 that is associated with the power-up mode, the environment controller 18 may transmit, to the interactive device 16, an updated status information indicating the power-up mode. The interactive device 16 may receive the updated status information and adjust its operation in accordance with the power-up mode. For example, the interactive device 16 may transmit a trigger condition that indicates the power-up mode when the trigger 20 is pulled. In turn, the environment controller 18, after receiving the trigger indication indicating the power-up mode, may cause the display of the interactive device system 12 to display an image of a projectile that corresponds to the power-up mode. For example, the environment controller 18 may cause the display to display relatively larger projectiles being fired by the interactive device 16, projectiles with a fire effect, activate certain feedback devices 38 such as haptics (e.g., giving the user the impression that the interactive device 16 is firing more powerful projectiles) and the like. Another example of a mode may include a "stuck trigger mode" that causes the interactive device 16 to transmit additional trigger conditions (e.g., 1, 2, 3, 4, 5, or more additional trigger conditions) corresponding to the trigger 20 being pulled repeatedly or pulled for a time period that does not actually correspond to how the guest is pulling the trigger 20. Another example of a mode may include a "shaky device mode" that causes the interactive device 16 to transmit an adjusted position status data 72 and/or orientation status data 74 (e.g., introducing noise into the position status data 72 and/or the orientation status data 74) that may obscure the actual position status data 72 and/or the actual orientation status data 74, thereby making it more difficult for the guest 14 to hit a target with the interactive device 16.

Figure 6:
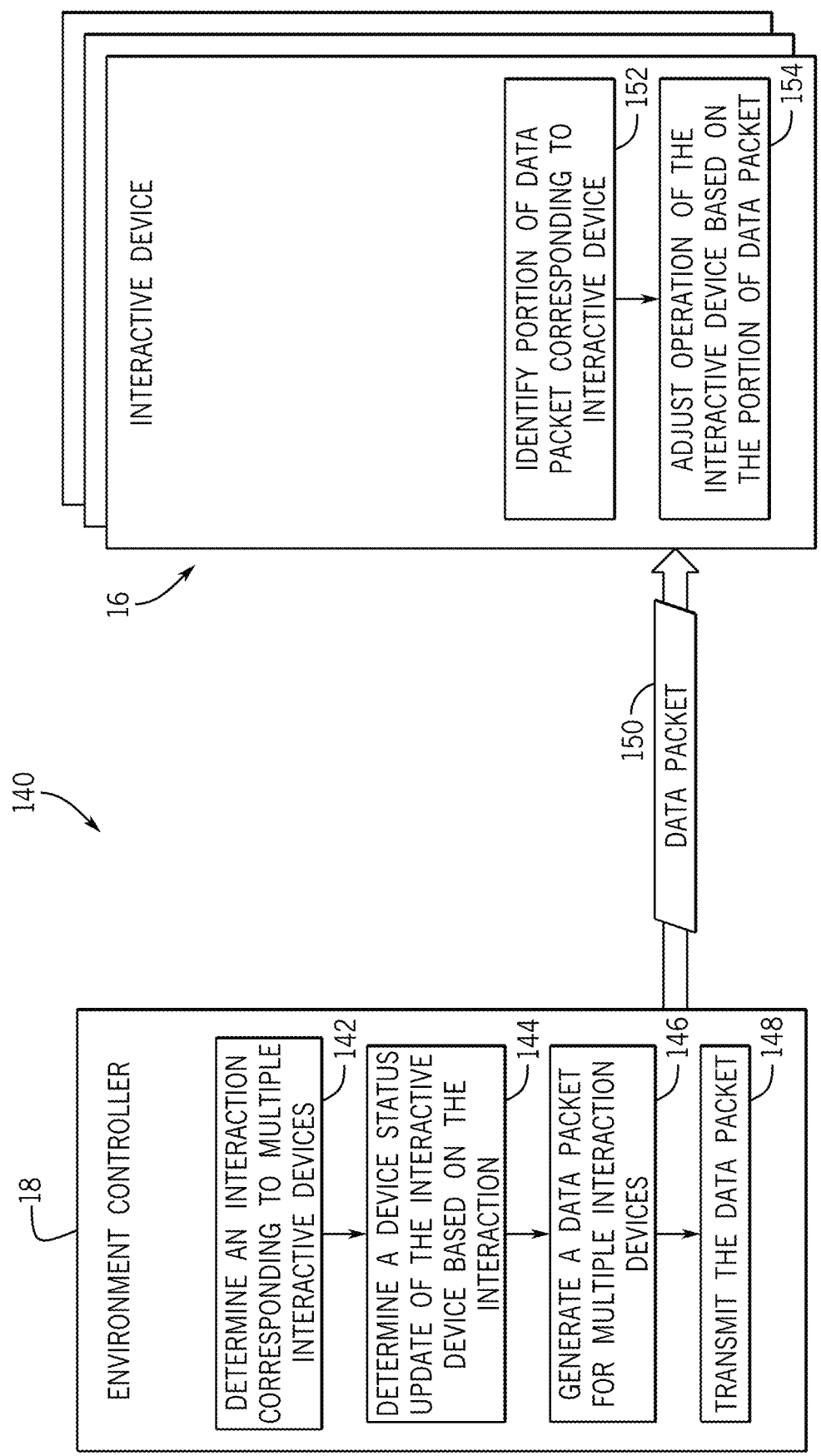
FIG. 6 is a data flow diagram illustrating multiple interactive devices identifying a portion of a data packet associated with a respective interactive device, in accordance with an aspect of the present disclosure.

In some embodiments, the environment controller 18 may communicate a single data packet for multiple interactive devices 16. That is, the data packet may include multiple instructions and each instruction is specific to one or more particular interactive devices 16. As such, each interactive device 16 may utilize only a portion (e.g., less than 100%) of the entire data packet to adjust operation of the interactive device 16, such as by modifying the amount of data transmitted by the interactive device 16. To illustrate this, FIG. 6 is a data flow diagram illustrating a process 140 for tracking position status data 72 and orientation status data 74 of an interactive device 16. In general, certain process blocks performed in the process 140 may be performed by particular components, such as the processor 32 of the interactive device(s) 16 and/or the processor 52 of the environment controller 18. However, for simplicity, the actions described below are being described with respect to the interactive device 16 rather than the processor 32, and the environment controller 18 rather than the processor 52. Moreover, certain process blocks may be performed in a different order than that illustrated, and, indeed, in some embodiments, certain process blocks may be skipped altogether.

At block 142, the environment controller 18 receives interaction information for multiple interactive devices 16. In general, the environment controller 18 may perform block 142 in a generally similar manner as block 122 described in FIG. 5, but for multiple interactions and/or multiple interactive devices 16.

At block 144, the environment controller 18 may determine a device status update for each of the interactive devices 16. In general, the environment controller 18 may perform block 142 in a generally similar manner as block 124 described in FIG. 5, but for multiple interactions and/or multiple interactive devices 16. For example, the environment controller 18 may determine to provide a power-up to multiple interactive devices 16 on a team as a result of one or more of the players interacting with a particular feature, scoring above a threshold number of points, and so one. In some embodiments, the environment controller 18 may include metadata indicating a particular interactive device 16, such as a tag corresponding to a particular team, a tag corresponding to a particular interactive device 16, and so on.

At block 146, the environment controller generates a data packet for multiple interactive devices 16 based on the multiple interactions. In general, the data packet may include information (e.g., device status updates relevant for multiple interactive devices 16. For example, the data packet may include a first data for a first device status update for a first interactive device 16. Additionally, the data packet may include a second data for a second device status update for a second interactive device 16. At block 148, the environment controller 18 transmits the data packet 150.

At block 152, an interactive device 16 determines a portion of the data packet 150 corresponding to a respective interactive device 16. That is, the interactive device 16 may determine a device status update that corresponds to the interactive device 16, while not utilizing other device status updates included in the data packet that are not intended to be utilized by the interactive device 16. For example, the data packet 150 may include a first portion that is a first device status update corresponding to a power-up for a first set of interactive devices 16 corresponding to a first team. Further, the data packet 150 may also include a second portion that is a second device status update corresponding to a stuck-trigger mode for a second set of interactive devices 16. Accordingly, the interactive device(s) 16 corresponding to the first team may identify and access the first device status update. Further, the interactive device(s) 16 corresponding to the second team may identify and access the second device status update.

At block 154, the interactive devices 16 may adjust, modify, or otherwise change operation based on the portion of the data packet identified by a respective interactive device 16 at block 152. In general, the interactive devices 16 may perform block 154 in a generally similar manner as described with respect to block 134 of FIG. 5. As one non-limiting example of the process 140, the environment controller 18 may determine that a first interactive device 16 of a first team performed an interaction corresponding to a first mode (e.g., "power-up mode"). Further, the environment controller may determine that a second interactive device 16 of a second team performed an interaction correspond to a second mode (e.g., "shaky mode"). As such, the environment controller 18 may generate a data packet 150 that includes a first device status update for the interactive device(s) 16 of the first time and a second device status update for the interactive device(s) 16 of the second time and transmit the data packet. Upon receiving the data packet 150, the interactive device(s) 16 corresponding to the first team may access the first device status update and modify data transmitted by the interactive device(s) 16 in accordance with the first mode. Further, the interactive device(s) 16 corresponding to the second team may access the second device status update and modify data transmitted by the interactive device(s) 16 in accordance with the first mode. For example, the interactive device(s) 16 may transmit respective device status identifiers that cause the environment controller 18 to adjust data received from the interactive device(s) 16, apply a noise adjustment, indicate that the trigger has been pulled one or more additional times, and the like. In this way, the process 140 may be used to control operation of multiple interactive devices 16 with a particular transmission schedule to reduce the amount of processing and analysis performed by the environment controller 18.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An interactive system, comprising:
    an environment controller; and
    an interactive device comprising one or more processors, one or more memory devices, and communication circuitry, wherein the interactive device is communicatively coupled to the environment controller, and wherein the one or more processors are configured to:
        transmit regularly monitored data corresponding to the interactive device to the environment controller at a plurality of transmission schedules;
        receive transitory data indicative of an interaction with the interactive device;
        determine a transmission schedule of the plurality of transmission schedules on which to transmit the transitory data; and
        transmit the transitory data on the transmission schedule along with a corresponding portion of the regularly monitored data to the environment controller.

2. The interactive system of claim 1, wherein the one or more processors are configured to transmit a first portion of the transitory data on the transmission schedule and a second portion of the transitory data on an additional transmission schedule of the plurality of transmission schedules.

3. The interactive system of claim 1, wherein the one or more processors are configured to determine the transmission schedule from the plurality of transmission schedules based on earliest availability of bandwidth.

4. The interactive system of claim 1, wherein regularly monitored data comprises interactive device state data, position status data, orientation status data, or a combination thereof.

5. The interactive system of claim 1, wherein the one or more processors are configured to receive the transitory data based on activation of an input of the interactive device.

6. The interactive system of claim 1, wherein the communication circuitry comprises ultra-wideband (UWB) communication circuitry.

7. The interactive system of claim 1, wherein the one or more processors are configured to efficiently operate by not transmitting indications of a lack of the transitory data.

8. The interactive system of claim 1, wherein the regularly monitored data comprises a battery status information of a battery of the interactive device, a temperature of the interactive device, a memory usage of the interactive device, an interactive identifier of the interactive device, or a combination thereof.

9. The interactive system of claim 1, wherein the environment controller is configured to transmit a device status update to the interactive device in response to the transitory data.

10. The interactive system of claim 1, wherein transmitting the transitory data on the transmission schedule comprises:
    transmitting a first portion of the transitory data with a first transmission on the transmission schedule; and
    transmitting a second portion of the transitory data with a second transmission distinct from the first transmission on the transmission schedule.

11. A method, comprising:
    transmitting, via one or more processors of an interactive device, a first data set comprising a first type of information associated with the interactive device to an external controller on a first transmission schedule;
    transmitting, via the one or more processors of the interactive device, a second data set comprising a second type of information associated with the interactive device to the external controller on a second transmission schedule;
    receiving, via the one or more processors of the interactive device, an indication of an interaction between one or more guests and an interactive environment in which the interactive device is in use;
    determining, via the one or more processors of the interactive device, to transmit interaction information indicating the interaction on the first transmission schedule based on the indication, wherein the interaction information is not of the first type of information; and
    transmitting, via the one or more processors of the interactive device, interaction information to the external controller on the first transmission schedule along with the first type of information.

12. The method of claim 11, wherein the interaction comprises an input of the interactive device being activated.

13. The method of claim 12, wherein the interaction information indicates a duration the input was activated, a number of times the input was activated, or a combination thereof.

14. The method of claim 11, wherein the first type of information and the second type of information include regularly monitored data and wherein the interaction information includes transitory data.

15. The method of claim 14, comprising receiving, via the one or more processors of the interactive device, a device status update from the external controller based on the transitory data.

16. The method of claim 15, comprising activating, via the one or more processors of the interactive device, one or more feedback devices of the interactive device based on the device status update.

17. A system, comprising:
    an environment controller configured to transmit a data packet comprising a plurality of device status updates; and
    a plurality of interactive devices, wherein each interactive device of the plurality of interactive devices comprises one or more processors, one or more memory devices, and communication circuitry, wherein the plurality of interactive devices are communicatively coupled to the environment controller, and wherein the one or more processors of a respective interactive device are configured to:

receive the data packet;

determine a device status update of the plurality of the device status updates corresponding to the respective interactive device;

receive an indication of an interaction between the respective interactive device and an interactive environment;

determine interaction information based on the indication;

modify the interaction information to generate a modified interaction information based on the device status update corresponding to the respective interactive device;

determine a transmission schedule to transmit the modified interaction information to the environment controller; and transmit the modified interaction information during one or more transmission events of the transmission schedule to the environment controller.

18. The system of claim 17, wherein the interactive devices comprise virtual projectile launchers.

19. The system of claim 17, wherein the plurality of interactive devices comprises one or more feedback devices, and wherein the one or more processors are configured to cause the one or more feedback devices to activate based on the device status update.

20. The system of claim 17, wherein the environment controller is configured to display a virtual projectile corresponding to the interaction between the interactive device and the interactive environment.

* * * * *